Feb. 27, 1940.   A. L. PARKER   2,191,582
TUBE COUPLING
Filed June 8, 1937

Inventor
Arthur L. Parker
By Mason + Porter
Attorneys

Patented Feb. 27, 1940

2,191,582

UNITED STATES PATENT OFFICE 2,191,582

TUBE COUPLING

Arthur L. Parker, Cleveland, Ohio

Application June 8, 1937, Serial No. 147,089

1 Claim. (Cl. 285—86)

The present invention relates to new and useful improvements in tube couplings, and more particularly to improvements in a tube coupling, of the type shown and described in my prior patent, number 1,893,442, granted January 3, 1933, for clamping the flared end of a metal tube. Such a coupling includes a pair of relatively movable coupling members and a clamping sleeve with which one of the coupling members cooperates to clamp the flared end of a tube against the other coupling member.

An object of the invention is to provide a tube coupling of the above type, wherein the clamping sleeve is made in separate parts so that each part may be accurately machined, and wherein the separately machined parts are subsequently joined together as a unit.

A further object of the invention is to provide a tube coupling of the above type, wherein the clamping sleeve includes an inner sleeve portion shaped to conform to the outer surface of the flared end of the metal tube, and a collar joined to and surrounding the inner sleeve portion having a hard surface on which one of the coupling members can freely turn when clamping the tube.

A further object of the invention is to provide a tube coupling of the above type, wherein the inner sleeve portion may be made of a relatively soft metal and wherein the collar is made of a relatively hard metal so as to present a hard surface on which one of the coupling members can freely turn.

A still further object of the invention is to provide a tube coupling of the above type, wherein both the inner sleeve portion and the collar may be made of a relatively soft metal and subsequently surface hardened, as by chromium plating, so as to present the desired hard surface on which one of the coupling members can freely turn.

The above and other objects of the invention will in part be obvious and will be hereinafter more fully pointed out.

Figures 1, 2, 3:
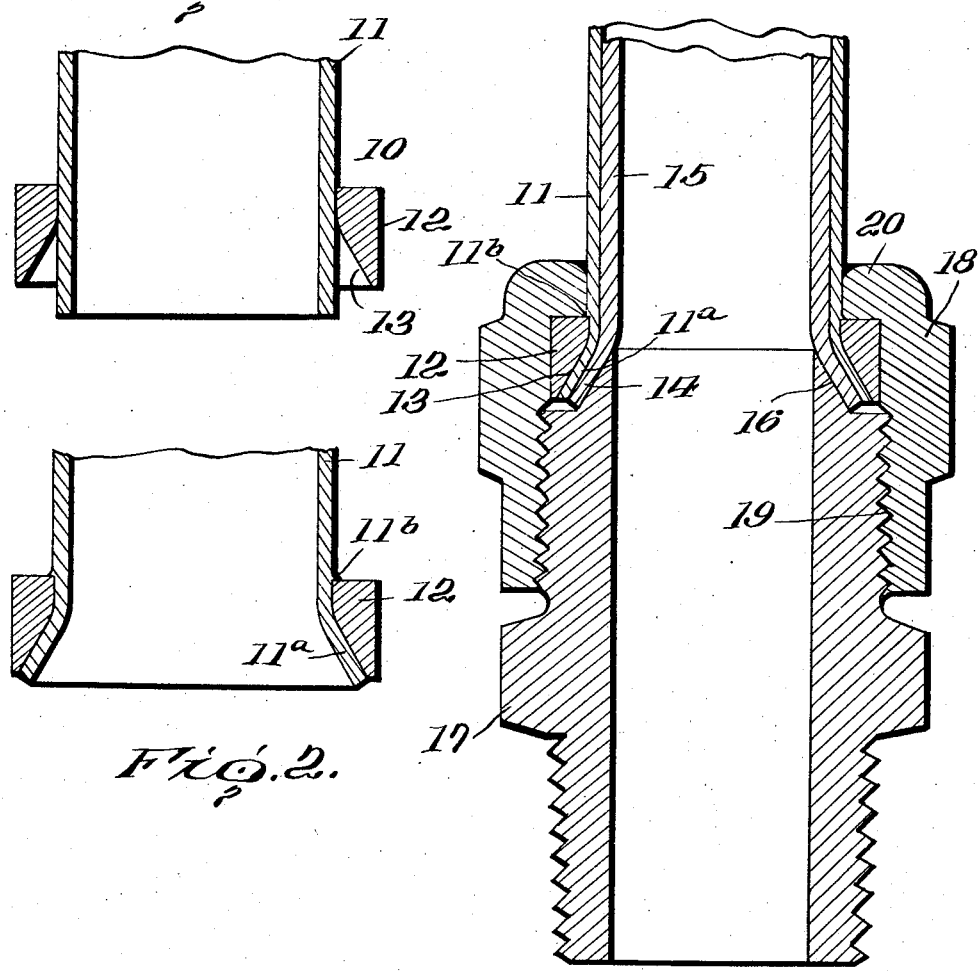
Fig. 1 is a fragmentary view, in section, showing the inner sleeve portion and the collar before they have been joined together.
Fig. 2 is a similar view, in section, showing the completed clamping sleeve after the inner sleeve portion and the collar have been joined together as a unit.
Fig. 3 is a longitudinal view, in section, showing the completely assembled coupling.

Heretofore, as illustrated in my aforesaid patent, it has been customary to form the clamping sleeve from a single piece of metal, that is, with the inner sleeve portion and the collar integral. Such a construction involves considerable expense in cutting away the metal and has a further disadvantage in the fact that it is difficult to provide an extremely accurate clamping member in this manner. According to the present invention, however, the clamping sleeve consists of separate parts which, after having been machined, are joined together to form a unitary non-integral construction. The clamping sleeve consists of an inner sleeve portion and a collar. The collar is formed with a tapered face corresponding to the tapered outer face of the flared end of a metal tube. In joining together the inner sleeve portion and the collar, the lower end of the sleeve portion is forced against the tapered surface on the collar so that it too, will conform to the outer tapered surface of the flared end of the tube, the inner tapered surface of the tube bearing against a tapered seat on a male coupling member. A female coupling member threadedly engages the male coupling member and is provided with an inwardly extending shoulder portion which is adapted to bear against the upper surface of the collar on the clamping sleeve so as to effect, by contact therewith, a tight clamping of the flared end of the tube between the clamping sleeve and the male coupling member.

Referring more in detail to the accompanying drawing, the clamping sleeve 10 is illustrated as including an inner sleeve portion 11 and a collar 12. The collar 12 is provided with a downwardly and outwardly tapered inner face 13 which corresponds in shape to the tapered outer surface of the flared end 14 of a metal tube 15. As shown in Fig. 1, the inner sleeve portion 11 is first inserted within the collar 12, which has been previously machined. The lower end 11a of the sleeve portion 11 is then pressed outwardly by a suitable tool as shown in Fig. 2, so that the collar 12 becomes slightly embedded therein. Thus, the lower end 11a of the sleeve portion 11 also conforms to the outer tapered surface on the flared end 14 of the tube. As further indicated in Fig. 2, a portion 11b of the inner sleeve portion 11 is crowded over the upper horizontal surface of the collar 12. The inner sleeve portion 11 and the collar 12 are thus joined together to form a unitary construction.

The clamping sleeve 10 is then placed over the metal tube 15 so that the outer tapered surface of the lower end 11a of the inner sleeve portion 11 is in contact with the outer tapered surface of the flared end 14 of the tube. The flared end 14 of the metal tube is then placed in contact with a tapered seat 16 on the male coupling member 17 which threadedly engages a female coupling member 18, as indicated at 19. The female coupling member 18 is provided with an inwardly extending shoulder portion 20 which is disposed over the upper end of the collar 12. The collar 12 thus provides a surface against which the shoulder portion 20 on the female coupling member may abut.

In effecting a clamping of the flared end 14 of the metal tube by relative movement of the coupling members 17 and 18 toward one another, it is desirable to prevent any turning of the clamping sleeve 10 so as to prevent twisting or otherwise disfiguring the metal tube 15. It is therefore necessary to provide relatively hard surfaces of contact between the shoulder portion 20 on the female coupling member and the collar 12 on the clamping sleeve. The provision of relatively hard surfaces of contact between the shoulder and the collar makes it possible for the female coupling member 18 to freely turn on the collar 12.

According to the present invention, the inner sleeve portion 11 of the clamping sleeve 10 may be made of a relatively soft metal, and the collar 20 may be made of a relatively hard metal. When the sleeve portion and the collar are joined together, the collar will thus present a hard surface against which the shoulder 20 on the female coupling member abuts. For this purpose, the inner sleeve portion 11 may be made of bronze or Duralumin and the collar may be made of stainless steel. It has also been found that both the inner sleeve portion and the collar may be made of a relatively soft material, such as bronze or Duralumin and then joined together. After the sleeve portion and the collar have been united, the entire surface of the clamping sleeve may be hardened, as by chromium plating, so that a hard surface is presented to the shoulder 20 on the female coupling member 18.

It is to be clearly understood that various changes in the details of construction and arrangement of parts may be made without departing from the scope of the invention as set forth in the appended claim.

What I claim is:

In a coupling for tubes having the ends thereof flared, coupling members having threaded engagement with each other, one of said coupling members having a seat associated therewith adapted to engage the inner face of the flared end of the tube and the other coupling member having a clamping shoulder, a sleeve surrounding said tube, and a collar surrounding the inner end of said sleeve, said collar having a tapered inner face conforming substantially to the outer tapered face of the flared end of the tube, the inner end of said sleeve being expanded and flared so as to conform to and fixedly engage the inner face of the collar and form therewith a unit clamping member having an external shoulder adapted to be engaged by the shoulder on the coupling member for clamping the flared end of the tube against the seat on the other coupling member.

ARTHUR L. PARKER.